Figure 1:
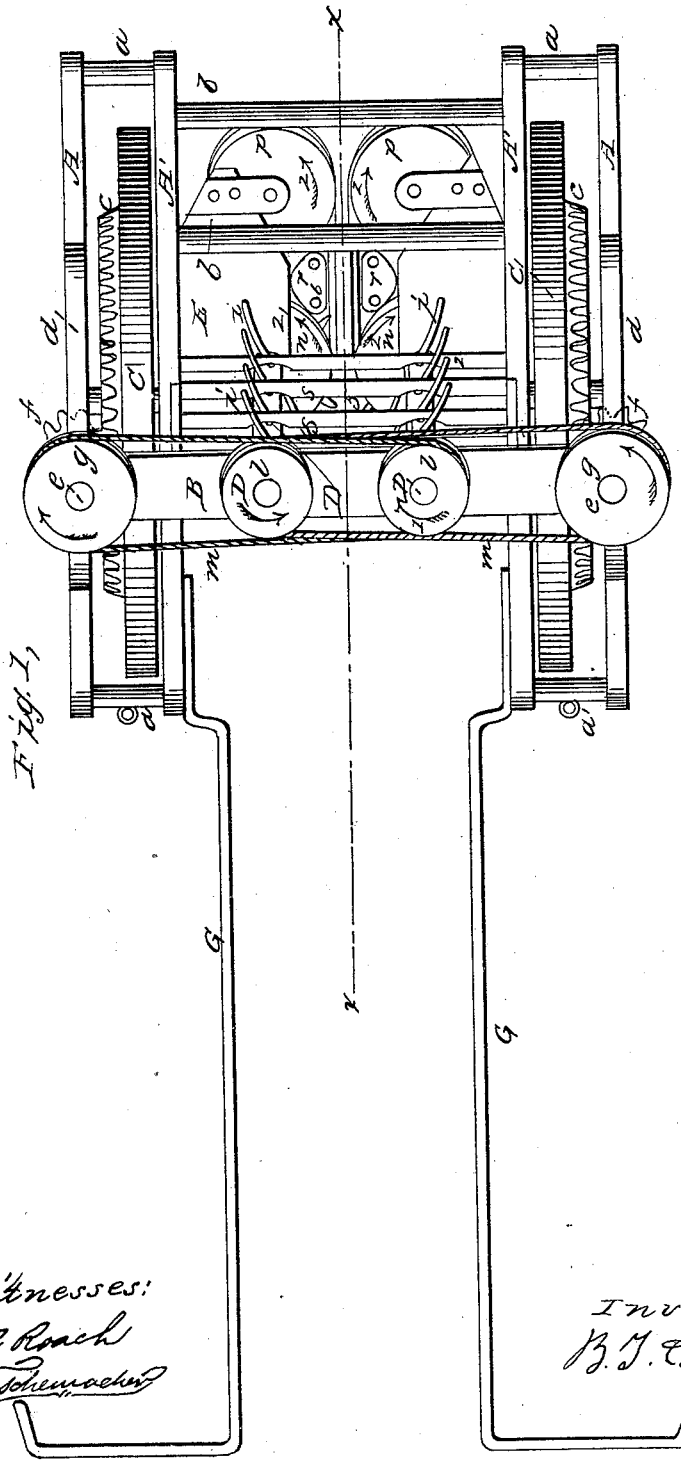

B. T. CURRIER.
Machine for Cutting up Cotton Plants.

No. 27,352.

2 Sheets—Sheet 1.

Patented March 6, 1860.

Witnesses:
Thos. R. Roach
O. E. Feschemacher

Inventor:
B. T. Currier

2 Sheets—Sheet 2.
B. T. CURRIER.
Machine for Cutting up Cotton Plants.
No. 27,352.
Patented March 6, 1860.
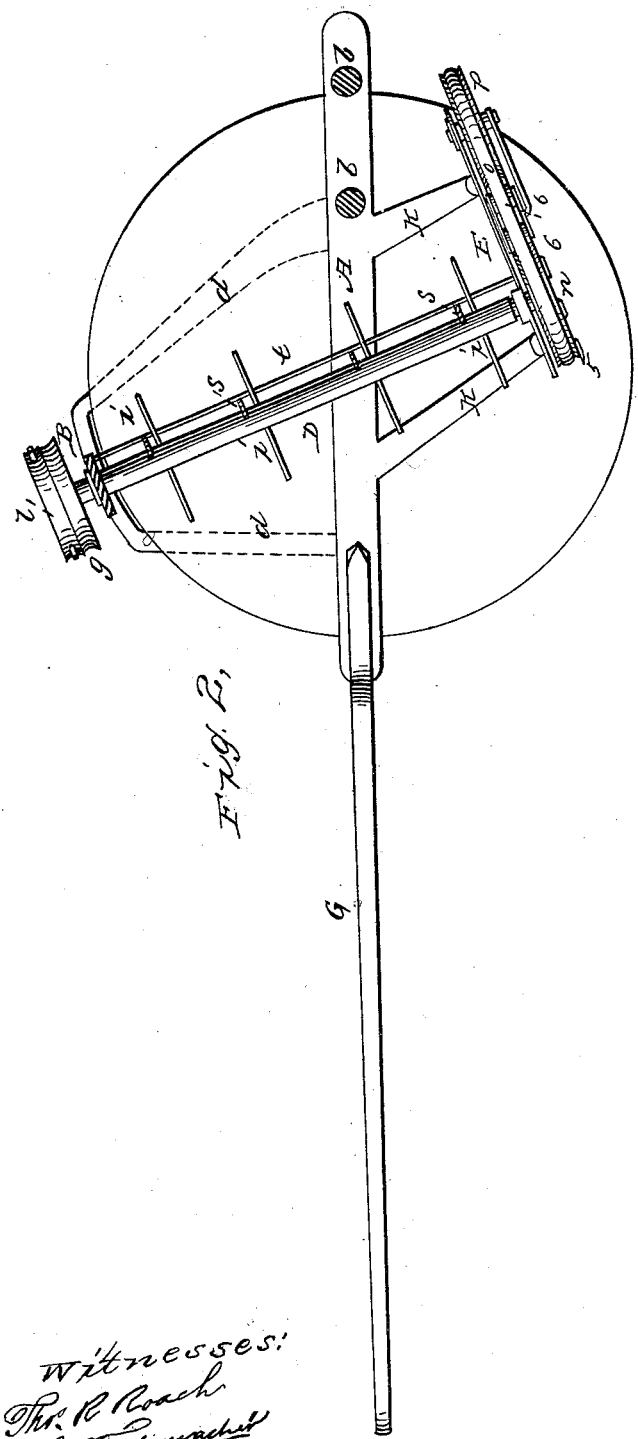

UNITED STATES PATENT OFFICE.

B. T. CURRIER, OF BATH, MAINE.

IMPROVEMENT IN MACHINES FOR CUTTING UP COTTON-PLANTS.

Specification forming part of Letters Patent No. 27,352, dated March 6, 1860.

*To all whom it may concern:*

Be it known that I, B. T. CURRIER, of Bath, in the county of Sagadahoc and State of Maine, have invented an Improved Machine for Cutting Up and Rooting Out the Stubble of Cotton-Plants, of which the following is a full, clear, and exact description, reference being had to the accompanying drawings, making part of this specification, in which—

Figure 1 is a plan of the machine; Fig. 2, a vertical section through the same on the line $x\ x$ of Fig. 1.

In the cultivation of cotton it is customary, after the cotton has been picked, to hoe up or pull out from the ground the stock or stubble before the ground is again plowed, as the long stocks interfere with the plowing. This is a troublesome and expensive operation.

My present invention consists in a machine for cutting the cotton-stubble into short pieces and for pulling up the root or stump of the plants and dropping them in rows on the ground, so that they may be readily turned under by the plow.

That others skilled in the art may understand and use my invention, I will proceed to describe the manner in which I have carried out the same.

In the said drawings, the frame of the machine consists of two heavy bars, A A', on each side of the machine, which are connected together in pairs by short braces $a\ a'$ at the front and rear ends, and the frames or pairs of bars are connected and held in position, as shown in Fig. 1, by two stout cross-braces, $b$, near the rear end of the machine, and by a broad flat bar, B, attached at each end to a standard, $d$, (dotted in Fig. 2,) which rises from the bar A.

Within the frame formed by the bars A A', on each side of the machine, is a carrying-wheel, C, to the outer side of which is attached a gear, $c$, of less diameter than the wheel itself, which engages with a beveled pinion, $f$, on a shaft, $e$, having its bearings in the bar A and in the end of the bar B. This shaft $e$ extends up a little above the bar B and carries a pulley, $g$.

Two shafts, D, which have projecting from them series of cutters $i$, have their bearings in the bar B and in a stirrup, E, which is suspended by braces $k$ from the lower side of each bar A', one on each side of the machine. To the top of each of these shafts D is attached a pulley, $l$, and a cord or suitable band, $m$, from one of the pulleys $g$ is led over one of the pulleys $l$, the bands being so arranged by crossing or otherwise that the shafts D will be revolved toward each other, as indicated by the arrows $i$. The shafts D are placed so that when the machine is being drawn over the ground and the frames A A' are horizontal, or nearly so, as shown in Fig. 2, these shafts shall be inclined forward at the top. The stirrup E is inclined to the horizon, rising toward the rear of the machine.

To the lower end of each shaft D, where it projects below the stirrup, is attached a pulley, $n$, on the under surface of which is a series of fingers or pins, 5, which extends out a little beyond the periphery of the pulley. Immediately in the rear of the pulley $n$ is another pair of pulleys, $p$, one on each side, which are supported in suitable bearings attached to the stirrup E. A continuous band, $o$, (in practice a chain would be used,) is led over a pulley, $n$, and a pulley, $p$, on each side, the two bands running close together in the middle of the machine.

Friction-rolls 6 in bars $r$, attached to the stirrups E, bear against the cords $o$ between the pulleys $n$ and $p$ and keep them parallel. The pulleys $n$ and $p$ are driven in the direction indicated by the arrows 2.

A series of metal bars, $s$, are placed immediately behind the shafts D and in close proximity to the cutters $i$. They are attached at each end to upright bars $t$, fastened at top to the bar B and at bottom to the stirrup E. The bars $s$ are so placed that as the shafts D are revolved the knives $i$ will pass over the front edges of the bars close to them, and the bars thus serve to support the cotton-stock while being cut by the knives. The animals drawing the machine are placed one on the outside of each of the shafts G, and draw on staples in the braces $a'$. They walk one on each side of a row of plants.

The wheels C are here represented as plain disks; but they may be of any convenient form, and, if necessary, the tread may be corrugated or roughened to give them sufficient hold on the ground to drive the shafts D.

The following is the operation of this machine: It is driven over the field lengthwise of a row of plants, the wheels C passing one on each side of the row. The bars S are thus brought into contact with the standing plants, and as the shafts D are revolved rapidly in the direction of their arrows the plants are cut by the knives $i$ into short pieces, which fall down to the ground. As the machine passes on the stump of the plant is seized by the fingers 5 on the pulleys $n$ and is carried between the bands $o$, (or chains,) which run close enough together to grasp and carry it up the incline in which the pulleys $n$ and $p$ are placed. This draws the roots from the ground and drops the stump at the rear of the machine.

The plants are thus strewn along the ground in rows and in small pieces, which will not obstruct the plows, and may be readily plowed under.

What I claim as my invention, and desire to secure by Letters Patent, is—

The revolving knives or cutters $i$ and the pulleys $np$, with their band $o$, operating substantially as described, for the purpose specified.

B. T. CURRIER.

Witnesses:
   THOS. R. ROACH,
   P. E. TESCHEMACHER.